United States Patent
Stahl, Sr. et al.

(10) Patent No.: US 7,694,474 B1
(45) Date of Patent: Apr. 13, 2010

(54) METHOD AND APPARATUS FOR FIRESTOPPING AROUND A WATER CLOSET DRAIN PIPE IN A VERTICAL FLOOR OPENING

(75) Inventors: James P. Stahl, Sr., Stockton, NJ (US); James P. Stahl, Jr., Princeton Junction, NJ (US)

(73) Assignee: Specified Technologies Inc., Somerville, NJ (US)

( * ) Notice: Subject to any disclaimer, the term of this patent is extended or adjusted under 35 U.S.C. 154(b) by 1055 days.

(21) Appl. No.: 11/340,906

(22) Filed: Jan. 26, 2006

(51) Int. Cl.
*E04C 2/52* (2006.01)
*E04C 2/00* (2006.01)
*E04B 1/94* (2006.01)

(52) U.S. Cl. .................... 52/232; 52/220.8; 52/317; 174/48

(58) Field of Classification Search .................. 52/1, 52/232, 220.8, 396.01; 174/360, 483, 48, 174/49
See application file for complete search history.

(56) References Cited

U.S. PATENT DOCUMENTS

| | | |
|---|---|---|
| 3,346,230 A | 10/1967 | Tolf, Jr. |
| 4,243,835 A * | 1/1981 | Ehrenfels .................... 174/483 |
| 4,261,598 A | 4/1981 | Cornwall |
| 4,313,286 A | 2/1982 | Harbeke |
| 4,482,161 A | 11/1984 | Izzi, Sr. |
| 4,566,242 A | 1/1986 | Dunsworth |
| 4,619,471 A | 10/1986 | Harbeke |
| 4,623,170 A | 11/1986 | Cornwall |
| 4,630,415 A | 12/1986 | Attwell |
| 4,638,829 A | 1/1987 | Cornwall |
| 4,648,139 A | 3/1987 | Stokes |
| 4,669,759 A | 6/1987 | Harbeke |
| 4,748,787 A | 6/1988 | Harbeke |
| 4,800,926 A | 1/1989 | Beck |
| 4,804,160 A | 2/1989 | Harbeke |
| 4,848,043 A | 7/1989 | Harbeke |
| 4,850,385 A | 7/1989 | Harbeke |
| 4,877,216 A | 10/1989 | Harbeke |
| 4,882,886 A | 11/1989 | Harbeke |
| 4,894,966 A | 1/1990 | Bailey et al. |
| 4,901,488 A | 2/1990 | Murota et al. |
| 4,916,800 A | 4/1990 | Harbeke |
| 4,918,761 A | 4/1990 | Harbeke |
| 4,964,180 A | 10/1990 | Harbeke |
| 5,003,127 A * | 3/1991 | Sosinski et al. ............. 174/483 |
| 5,032,690 A * | 7/1991 | Bloom ....................... 174/487 |
| 5,060,986 A | 10/1991 | Carter |
| 5,103,609 A | 4/1992 | Thoreson et al. |
| 5,105,592 A | 4/1992 | MacMillan et al. |
| 5,129,201 A | 7/1992 | Robertson et al. |
| 5,155,957 A | 10/1992 | Robertson et al. |
| 5,232,250 A | 8/1993 | Bonacci |
| 5,309,688 A | 5/1994 | Robertson |
| 5,347,767 A | 9/1994 | Roth |

(Continued)

*Primary Examiner*—Richard E Chilcot, Jr.
*Assistant Examiner*—Chi Q Nguyen
(74) *Attorney, Agent, or Firm*—Sperry, Zoda & Kane

(57) ABSTRACT

A firestopping device which is held between the flange of water closet flange assembly and the floor surrounding the opening containing the drain pipe which includes a securement section positioned therebetween for being held in place and an intumescent section extending radially inwardly therefrom to a position above the vertical drain pipe opening to facilitate intumescent expansion thereinto responsive to the exposure of heat.

12 Claims, 3 Drawing Sheets

U.S. PATENT DOCUMENTS

| | | |
|---|---|---|
| 5,390,465 A | 2/1995 | Rajecki |
| 5,747,732 A * | 5/1998 | Bera et al. .................. 174/483 |
| 5,765,332 A * | 6/1998 | Landin et al. ............ 52/396.01 |
| 5,814,764 A * | 9/1998 | Kohaut ....................... 174/360 |
| 5,953,872 A | 9/1999 | MacMillian et al. |
| 6,101,774 A | 8/2000 | Heil |
| 6,161,564 A | 12/2000 | Cornwall |
| 6,161,873 A | 12/2000 | Munzenberger et al. |
| 6,336,297 B1 | 1/2002 | Cornwall |
| 6,349,975 B1 | 2/2002 | Heil |
| 6,360,502 B1 | 3/2002 | Stahl, Jr. |
| 6,405,502 B1 | 6/2002 | Cornwall |
| 6,438,765 B1 | 8/2002 | Johnson et al. |
| 6,460,860 B2 | 10/2002 | Gavin |
| 6,470,635 B2 | 10/2002 | Cornwall |
| 6,643,985 B2 | 11/2003 | Munzenberger |
| 6,679,015 B1 | 1/2004 | Cornwall |
| 6,694,684 B2 | 2/2004 | Radke et al. |
| 6,789,275 B2 | 9/2004 | Spells, Sr. et al. |
| 6,928,777 B2 * | 8/2005 | Cordts ....................... 52/220.8 |
| 7,442,883 B2 * | 10/2008 | Jolly et al. .................. 174/483 |
| 7,523,590 B2 * | 4/2009 | Stahl, Sr. ..................... 52/232 |
| 2002/0032996 A1 * | 3/2002 | Cornwall ................... 52/220.8 |
| 2004/0016191 A1 * | 1/2004 | Whitty ........................ 52/232 |

* cited by examiner

METHOD AND APPARATUS FOR FIRESTOPPING AROUND A WATER CLOSET DRAIN PIPE IN A VERTICAL FLOOR OPENING

BACKGROUND OF THE INVENTION

1. Field of the Invention

The present invention deals with the field of devices for firestopping around drain pipes positioned in floors which are adapted to be secured with respect to a water closet by the use of a water closet flange assembly. Such devices are commonly subjected to firestopping by traditional caulking which is difficult to perform in view of the fact that the water closet after being bolted in place prevents access to the vertical floor opening. Therefore such caulking normally needs to be done from below which is sometimes very difficult based on the particular application or job. The present invention provides a unique configuration for a firestopping device which includes an outer section for securing it in place and an inner section positionable adjacent to the vertical drain opening in position surrounding the drain pipe which facilitates sealing of this annular region responsive to exposure thereof to heat.

2. Description of the Prior Art

Many patents have been designed for the purpose of firestopping of floor, ceiling, and wall openings such as toilet drain floor outlet holes as shown in U.S. Pat. No. 3,346,230 patented Oct. 10, 1967 to C. O. Tolf, Jr. and assigned to Construction Accessories Mfg. Corp. on a "Pipe Sleeve"; and U.S. Pat. No. 4,261,598 patented Apr. 14, 1981 to Kenneth R. Cornwall on a "Concrete Floor Embedded Coupling For Plastic Pipe"; and U.S. Pat. No. 4,313,286 patented Feb. 2, 1982 to Gerold J. Harbeke on a "Pipe Support Coupling And Method Of Using Same"; and U.S. Pat. No. 4,482,161 patented Nov. 13, 1984 to Lewis B. Issi, Sr. and assigned to Plastic Oddities, Inc. on a "Toilet Bowl Gasket Of Rubberlike Material Having Compressible Concentric Ridge Rings On Both Sides"; and U.S. Pat. No. 4,566,242 patented Jan. 28, 1986 to Charles L. Dunsworth and assigned to Metalines, Inc. on a "Smoke And Heat Barrier"; and U.S. Pat. No. 4,619,471 patented Oct. 28, 1986 to Gerold J. Harbeke on an "Embedded Pipe Coupling Holder"; and U.S. Pat. No. 4,623,170 patented Nov. 18, 1986 to Kenneth R. Cornwall on a "Coupling"; and U.S. Pat. No. 4,630,415 patented Dec. 23, 1986 to Ronald L. Attwell and assigned to Selkirk Division of Household Manufacturing Limited on a "Fire Stop"; and U.S. Pat. No. 4,638,829 patented Jan. 27, 1987 to Kenneth R. Cornwall on a "Firestop Fitting For Carrier Mounted Water Closets"; and U.S. Pat. No. 4,648,139 patented Mar. 10, 1987 to Darryll Stokes on a "Mounting Ring Assembly For A Toilet Bowl"; and U.S. Pat. No. 4,669,759 patented Jun. 2, 1987 to Gerold J. Harbeke on a "Fire-Stop Stack Fitting And Method Of Using Same"; an U.S. Pat. No. 4,748,787 patented Jun. 7, 1988 to Gerold J. Harbeke on a "Pipe Flange Fire-Proofing Kit And Process"; and U.S. Pat. No. 4,800,926 patented Jan. 31, 1989 to Paul C. Beck and assigned to Adolph Coors Company on a "Firebreak For Conduits"; and U.S. Pat. No. 4,804,160 patented Feb. 14, 1989 to Gerold J. Harbeke on an "Automatically-Releasable Pipe-Attachment Device" and U.S. Pat. No. 4,848,043 patented Jul. 18, 1989 to Gerold J. Harbeke on an "Under Floor Fire Stop Coupling And Method; and U.S. Pat. No. 4,850,385 patented Jul. 25, 1989 to Gerold J. Harbeke on a "Fire Stop Pipe Coupling Adaptor"; and United States Patent No. 4,877,216 patented Oct. 31, 1989 to Gerold J. Harbeke on a "Automatically-Releasable Pipe-Attachment Device"; and U.S. Pat. No. 4,882,886 patented Nov. 28, 1989 to Gerold J. Harbeke on an "Automatically-Releasable Pipe Attachment Device"; and U.S. Pat. No. 4,894,966 patented Jan. 23, 1990 to Paul R. Bailey et al on a "Fire Stopping Apparatus"; and U.S. Pat. No. 4,901,488 patented Feb. 20, 1990 to George Murota et al and assigned to The Furukawa Electric Co., Ltd. on a "Fire/Smoke Protection Structure For A Plastic Pipe Or Cable Channel Portion In A Floor Or Wall"; and U.S. Pat. No. 4,916,800 patented Apr. 17, 1990 to Gerold J. Harbeke on a "Fire-Retardant Fluid Coupling Assembly And Method"; and U.S. Pat. No. 4,918,761 patented Apr. 24, 1990 to Gerold J. Harbeke on a "Method Of Using A Toilet-Flange Cast-In Mount"; and U.S. Pat. No. 4,964,180 patented Oct. 23, 1990 to Gerold J. Harbeke on a "Shower Strainer Mounting Assembly; and U.S. Pat. No. 5,060,986 patented Oct. 29, 1991 to William Carter and assigned to Water Works Supply Corporation on a "Sleeve Adapter"; and U.S. Pat. No. 5,103,609 patented Apr. 14, 1992 to Thomas L. Thoreson et al and assigned to Minnesota Mining & Manufacturing Company on an "Intumescable Fire Stop Device"; and U.S. Pat. No. 5,105,592 patented Apr. 21, 1992 to George S. MacMillan et al and assigned to Fire Barrier Installations, Inc. on a "Fire Barrier Device"; and U.S. Pat. No. 5,129,201 patented Jul. 14, 1992 to Eric B. Robertson et al and assigned to National Improvement Company, Inc. on a "Fire Safety Device"; and U.S. Pat. No. 5,155,957 patented Oct. 20, 1992 to Eric B. Robertson et al and assigned to National Improvement Company on a "Fire Safety Device"; and U.S. Pat. No. 5,232,250 patented Aug. 3, 1993 to Anthony S. Bonacci on an "Adjustable Flange For Plumbing Fixtures"; and U.S. Pat. No. 5,309,688 patented May 10, 1994 to Paul Robertson on a "Concrete Slab Penetration Unit For Pipes"; and U.S. Pat. No. 5,347,767 patented Sep. 20, 1994 to Rudolf Roth on a "Fire Retardant Sleeve; and U.S. Pat. No. 5,390,465 patented Feb. 21, 1995 to James A. Rajecki and assigned to The Lamson & Sessions Co. on a "Passthrough Device With Firestop"; and U.S. Pat. No. 5,953,872 patented Sep. 21, 1999 to George S. MacMillian et al on a "Fire Barrier Assembly"; and U.S. Pat. No. 6,101,774 patented Aug. 15, 2000 to Deryl Heil on a "Slab Plumbing System"; and U.S. Pat. No. 6,161,564 patented Dec. 19, 2000 to Kenneth R. Cornwall on a "Fire Transmission Prevention System"; and U.S. Pat. No. 6,161,873 patented Dec. 19, 2000 to Herbert Munzenberger et al and assigned to Hilti Aktiengesellschaft on a "Masonry Lead-In Fixture"; and U.S. Pat. No. 6,336,297 patented Jan. 8, 2002 to Kenneth R. Cornwall on a "Self Sealing Firestop Coupling Assembly"; and U.S. Pat. No. 6,349,975 patented Feb. 26, 2002 to Deryl Heil on a "Slab Plumbing System"; and U.S. Pat. No. 6,360,502 patented Mar. 26, 2002 to James P. Stahl, Jr. and assigned to Specified Technolgies Inc. on a "Firestop Collar Means With Improved Mounting Means"; and U.S. Pat. No. 6,405,502 patented Jun. 18, 2002 to Kenneth R. Cornwall on a "Firestop Assembly Comprising Intumescent Material Within A Metal Extension Mounted On The Inner Surface Of A Plastic Coupling"; and U.S. Pat. No. 6,438,765 patented Aug. 27, 2002 to Michael W. Johnson et al on a "Toilet Sealing Ring Adapter Assembly"; and U.S. Pat. No. 6,460,860 patented Oct. 8, 2002 to Norman W. Gavin on a "Pipe Seal For Cast Concrete"; and U.S. Pat. No. 6,470,635 patented Oct. 29, 2002 to Kenneth R. Cornwall on a "Coupling Assembly With Intumescent Material"; and U.S. Pat. No. 6,643,985 patented Nov. 11, 2002 to Herbert Munzenberger and assigned to Hilti Aktiengesellschaft on a "Tubular Lead-In Fixture"; and U.S. Pat. No. 6,679,015 patented Jan. 20, 2004 to Kenneth R. Cornwall on a "Hub Seal Firestop Device"; and U.S. Pat. No. 6,694,684 patented Feb. 24, 2004 to DuWayne C. Radke et al and assigned to 3M Innovative Properties Company on a "Pass Through Firestop Device"; and U.S. Pat. No. 6,789,275 patented Sep. 14, 2004 to Michael W. Spells, Sr. et al on a "Non-Leaking Flush Toilet System".

SUMMARY OF THE INVENTION

The present invention provides an improved firestopping device which is responsive to heating thereof for selectively sealing a vertical opening in a floor assembly having a drain pipe extending upwardly therewithin. Such drain pipes are attachable to a conventional water closet by a water closet flange assembly which includes a flange attachable directly to a water closet and a drain pipe engaging device attachable to a drain pipe. The improved firestopping mechanism preferably includes an outer securement section adapted to be positioned on the floor assembly surrounding the vertical opening between the water closet flange means of the water closet flange assembly for retaining and improving firestopping therebetween. Also the improved, firestopping means preferably includes an inner intumescent section attached with respect to the outer securement section and extending radially inwardly therefrom adjacent to the vertical opening in the floor assembly to facilitate sealing downwardly thereinto responsive to heating thereof.

The present invention also includes the method for firestopping around a water closet drain pipe in a vertical floor which method includes initially the providing of a firestopping member with an outer securement section and an inner intumescent section. The firestopping member is positioned with the outer securement section thereof located on the upper surface of the floor surrounding the vertical opening through which the drain pipe extends vertically upwardly therewithin. It is also positioned with the inner intumescent section thereof positioned extending adjacent to the vertical opening around the drain pipe for the purpose of aiding in sealing therearound within the vertical opening responsive to exposure to heat. Thereafter a water closet flange assembly is provided with a drain pipe engaging means and an outer flange member which are detachably securable to a water closet. The outer flange of the water closet flange assembly is then positioned onto the top of the outer securement section of the firestopping member for facilitating and retaining thereof between the water closet flange assembly and the upper surface of the floor assembly surrounding the vertical opening. The drain pipe engaging means is then secured to the water closet flange assembly with respect to the water closet drain pipe. The water closet is then attached to the water closet drain pipe by securing of the water closet to the outer flange member of the water closet flange assembly. In this manner the ease of providing a firestopping means surrounding a water closet drain pipe is greatly facilitated.

It is an object of the present invention to provide a method and apparatus for firestopping around a water closet drain pipe in a vertical floor opening wherein placement of the firestopping means is performed prior to securement of the water closet flange assembly.

It is an object of the present invention to provide a method and apparatus for firestopping around a water closet drain pipe in a vertical floor opening wherein the outer securement section of the firestopping member is held in place by being retained above the floor immediately surrounding the drain pipe opening and below the water closet flange with the intumescent section extending inwardly therefrom adjacent to the annular portion of the drain pipe aperture which surrounds the water closet drain pipe.

It is an object of the present invention to provide a method and apparatus for firestopping around a water closet drain pipe in a vertical floor opening which is of minimal expense.

It is an object of the present invention to provide a method and apparatus for firestopping around a water closet drain pipe in a vertical floor which greatly facilitates the installation of a water closet.

It is an object of the present invention to provide a method and apparatus for firestopping around a water closet drain pipe in a vertical floor which significantly reduces the amount of time required to install a fully firestopped water closet device.

It is an object of the present invention to provide a method and apparatus for firestopping around a water closet drain pipe in a vertical floor which includes an outer securement section with a radially inwardly extending intumescent section positioned over and above the annular region within the vertical hole for facilitating intumescent sealing around a water closet drain pipe positioned therewithin.

It is an object of the present invention to provide a method and apparatus for firestopping around a water closet drain pipe in a vertical floor which can facilitate downward intumescent sealing of the annular region within the vertical opening around the drain pipe without initial positioning of the firestopping member within the drain pipe hole itself.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
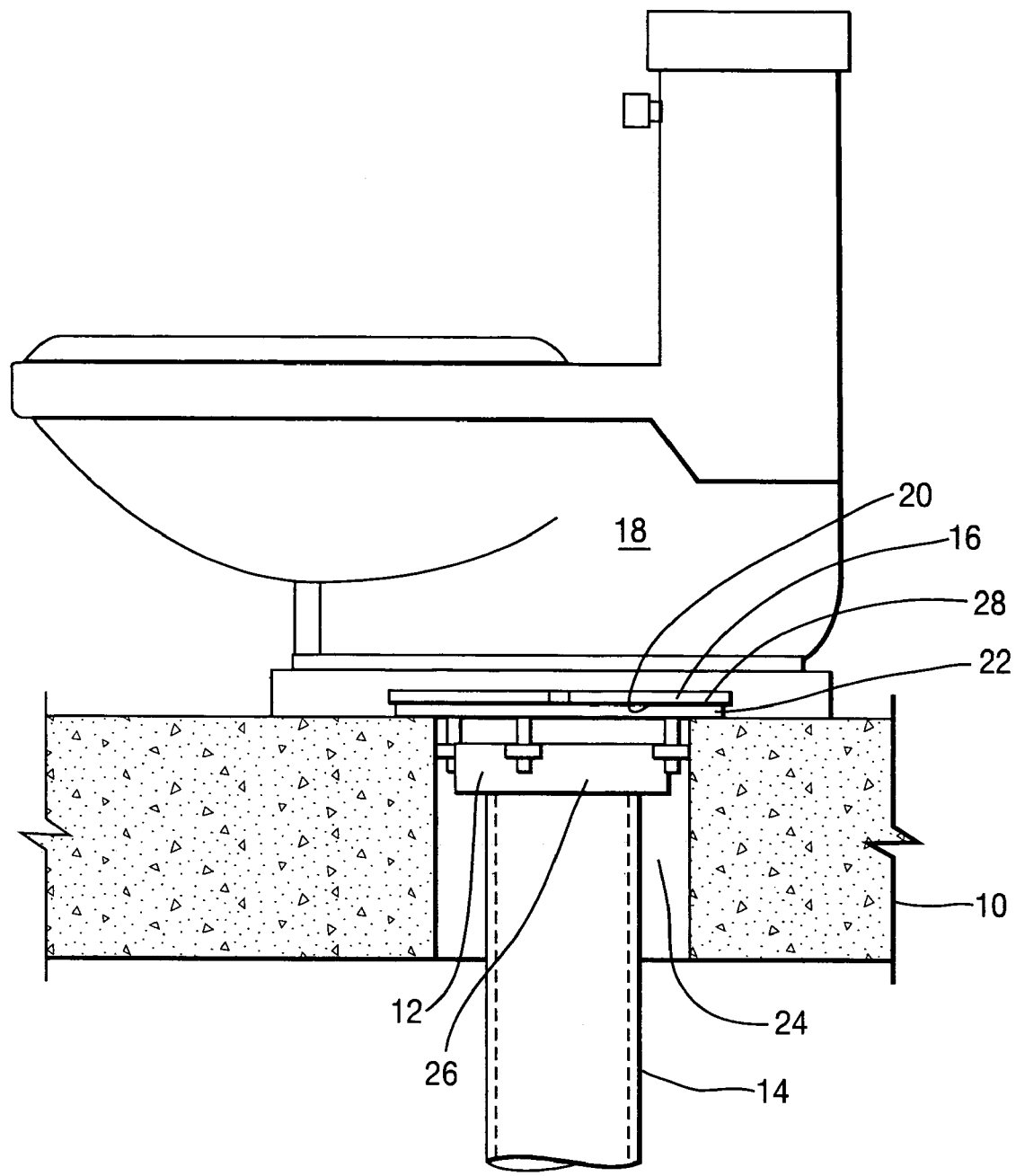
FIG. 1 is a side cross-sectional view of an embodiment of the firestopping means of the present invention shown fully installed between a water closet flange and the upper surface of the floor surrounding a water closet drain opening with the water closet shown fully installed.
Figure 2:
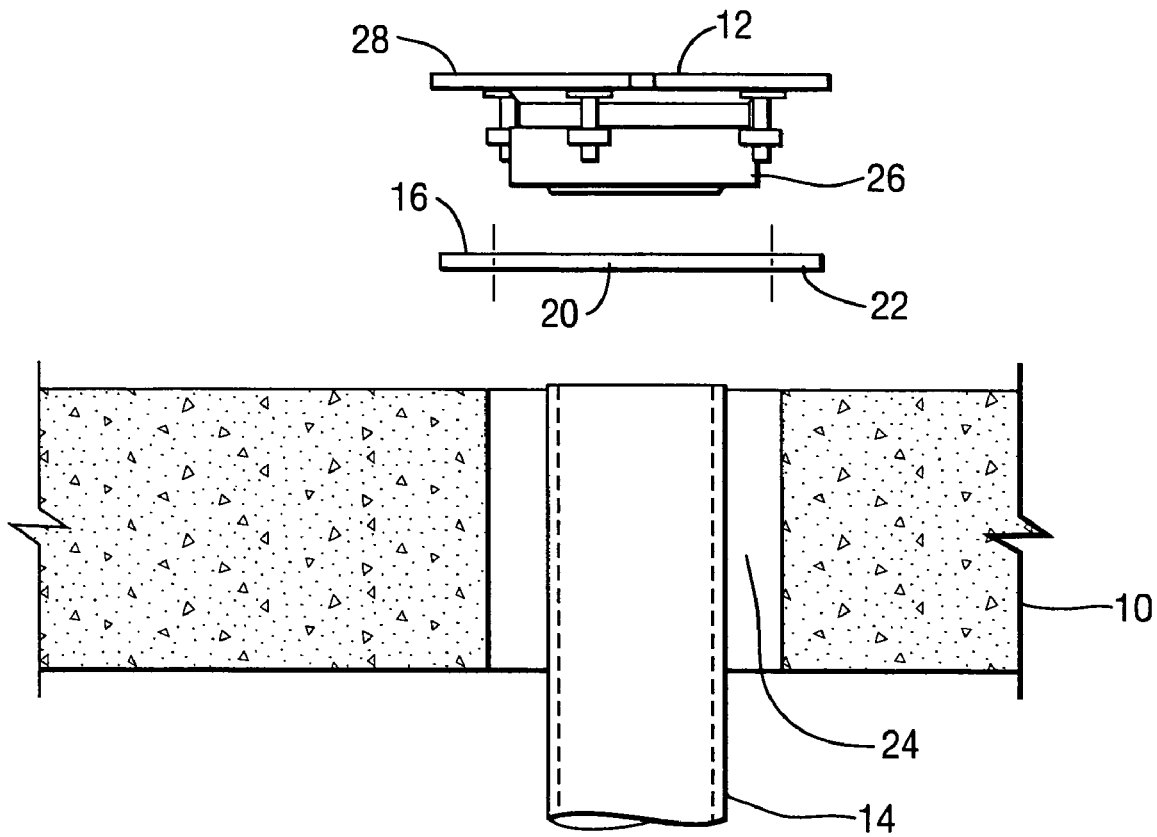
FIG. 2 is a side exploded view showing the alignment of the water closet flange assembly, firestopping means, drain pipe and floor opening therearound in side cross-section.
Figure 3:
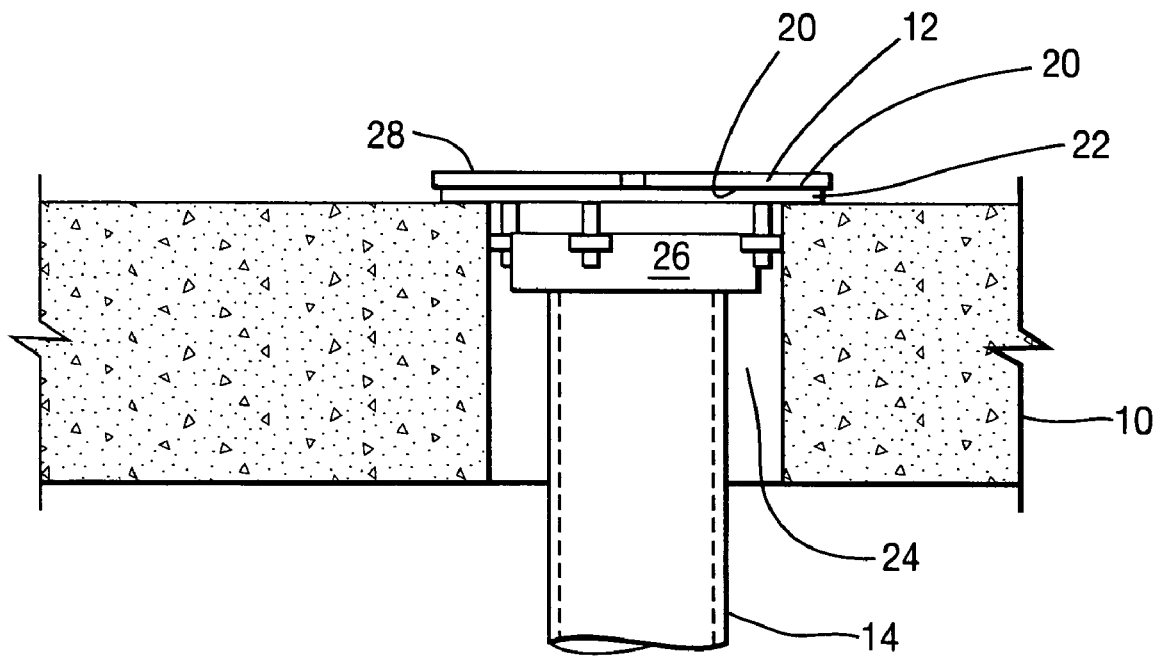
FIG. 3 shows the configuration of FIG. 2 in the fully assembled position prior to securement of the water closet thereto.
Figure 4:
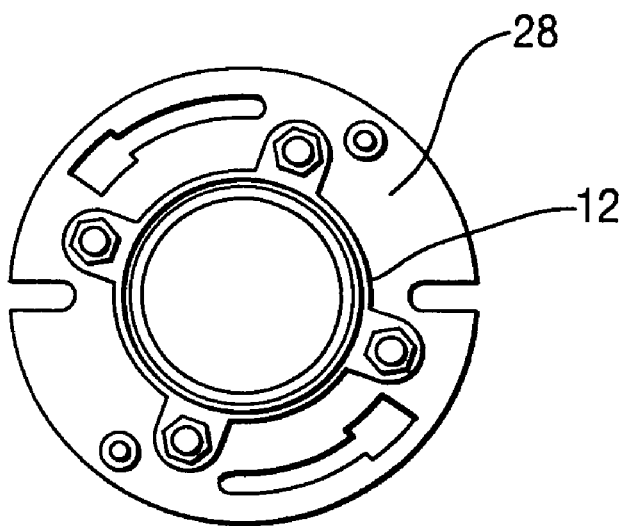
FIG. 4 is a top plan view of an embodiment of the water closet flange assembly used with the present invention.
Figure 5:
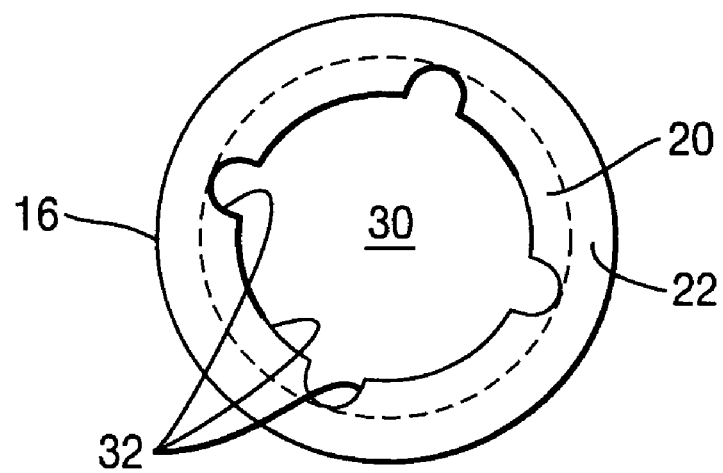
FIG. 5 is a top plan view of an embodiment of the improved firestopping means of the present invention showing the outer securement section and the inner intumescent section as well as the contoured inner edge for facilitating intumescent sealing thereadjacent.

The present invention provides a unique configuration for a firestopping member 16. This firestopping member 16 preferably is annular in shape and includes an outer securement section 22 and an inner securement section 20.

This firestopping member 16 is designed to seal a vertical opening 24 within a floor assembly 10 in which is normally positioned a water closet drain pipe 14. These drain pipes 14 will extend vertically normally through the center of a generally round vertical opening 24 which normally has a maximum size of approximately five inches. This upwardly facing stub of pipe 14 is designed to be secured with respect to a water closet 18 which is normally made of a vitreous china.

Attachment between the water closet 18 and the stub of the drain pipe 14 is normally achieved by the inclusion of a water closet flange assembly 12. Such water closet flange assembly 12 is normally of a metallic material which can be cast iron or ductiled iron or any other similar material. The water closet flange assembly 12 includes two major components. Firstly a drain pipe engaging means 26 is designed to be secured to the upwardly extending stub end of the water closet drain pipe 14. The water closet flange assembly 12 also includes an outer flange member 28 designed to be detachably securable with respect to the water closet 18 and in this manner firm securement between the water closet 18 and the drain pipe 14 and the floor assembly 10 is achieved.

The novel characteristic of the present invention is in the configuration of the firestopping member 16. Member 16 includes an outer flange member 28 designed to be positioned upon the floor assembly 10 in the area thereof immediately adjacent to the vertical opening 24 extending through the floor assembly 10. The positioning of the firestopping member 16 with the outer securement section 22 resting upon the floor assembly 10 immediately adjacent to the vertical opening 24 is important in view of the fact that this placement is performed prior to installation of the water closet flange assembly 12. Thus, once the outer securement section 22 of the firestopping member 16 is in place on top of the floor assembly 10 around the vertical opening 24, then the outer flange member 28 of the water closet flange assembly 12 is placed on top of the upper portion of the outer securement section 22. This placement will initially hold or retain the firestopping member 16 in the position sandwiched between the upwardly facing floor surround and the downwardly facing outer flange 28. The water closet flange assembly 12 can then have the drain pipe engaging means 26 thereof secured with respect to the drain pipe 14 and the outer flange member 28 thereof secured with respect to the water closet 18. These two securement modes will allow the water closet 18 to be firmly secured with respect to the floor assembly 10 and the stub of the water closet drain pipe 14 while at the same time it will exert a downward pressure through the outer flange member 28 thereof onto the outer securement section 22 of the firestopping member 16 for holding it in place.

An inner intumescent section 20 will extend radially inwardly from the generally annular shaped outer securement section 22. This inner intumescent section 20 is preferably positioned immediately adjacent to the vertical opening 24 when the outer securement section 22 is firmly retained in place between flange member 28 and floor assembly 10.

In the preferred configuration the outer securement section 22 will be generally annular or ring-shaped and the inner intumescent section 20 will extend radially inwardly therefrom to a position immediately adjacent to the vertical opening 24 and immediately thereabove and extending thereover. As such, whenever the firestopping member 16 is exposed to heat significantly elevated temperatures such as during a fire, the inner intumescent section 20 will expand in an intumescent manner downwardly into the annular space outside of the drain pipe 14 with the vertical opening 24. The unique characteristic of the present invention is in the capability of placing a firestopping member or device 16 in place adjacent to the vertical opening 24 around a water closet drain pipe 14 and facilitating expansion thereof responsive to heat for sealing such openings which are inherently difficult to seal through intumescent means.

Preferably the inner intumescent section 20 will also define a drain pipe aperture 30 such that the inner intumescent section 20 can be positioned around the stub of the drain pipe 14 with the contoured inner edge 32 thereof in engagement with respect to the water closet drain pipe 14 or with respect to the water closet flange assembly 12 to facilitate sealing immediately thereadjacent responsive to exposure to heat. Preferably the contoured inner edge 32 of the inner intumescent section 20 will be of a shape which is complementary to the external shape of the water closet drain pipe 14 and the external shape of the water closet flange assembly 12. The present invention is also significantly enhanced by the use of material such as an intumescent foam material for the inner intumescent section 20 of the firestopping member 16. Alternatively the entire firestopping member 16 can be formed of a resilient intumescent material in order to make the cost of producing of the firestopping members of the present invention less since the inner intumescent section 20 and the outer intumescent section 22 can be punched from a sheet of such material.

One of the unique advantages of the present invention is that the use of this configuration for the firestopping member 16 allows a plumber to install the device immediately prior to the water closet 18 being set in position. This firestopping member which is preferably ring-shaped will install around the drain stub prior to the installation of the water closet flange assembly 12 itself. In this manner the toilet is thereafter installed normally which allows the complete installation process in regard to both the water closet and the firestopping member to be performed in an efficient and continuous process with less labor and more speedy installation. Also this configuration provides a significantly higher degree of protection than is available by traditional caulking which is the more common method for sealing such water closet applications. One of the important preferred embodiments of the present invention is in the positioning of the inner intumescent section 20 extending inwardly from the outer securement section 22 of firestopping member 16 at a location above rather than within the annular region surrounding the drain pipe within the vertical opening. Thus, full firestopping of a vertical opening 24 located around a water closet drain pipe 14 is achieved without requiring the placement of any intumescent material in the annular region between the pipe 14 and the floor assembly 10 around opening 24. By positioning of the inner intumescent section 20 immediately above and over the annular region to be subject to firestopping, the firestopping thereof will be greatly facilitated since the intumescent material when expanding in response to heat will flow smoothly and powerfully downwardly into this annular region.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An improved firestopping means being responsive to heating thereof for selectively sealing a vertical opening in a floor assembly having a drain pipe extending upwardly therewithin, the drain pipe being attachable to a water closet by a water closet flange assembly which includes a water closet flange means attachable to a water closet and a drain pipe engaging means attachable to the drain pipe, said improved firestopping means comprising:

A. an outer securement section is positioned immediately above a generally horizontally extending upwardly facing surface of the floor assembly immediately surrounding the vertical opening beneath the water closet flange means of the water closet flange assembly for retaining said improved firestopping means therebetween; and B. an inner intumescent section attached with respect to said outer securement section and extending radially inwardly thereunder along and in abutting contact with the generally horizontally extending upwardly facing surface of the floor assembly surrounding the vertical opening therein to facilitate sealing downwardly thereinto responsive to heating thereof, said inner intumescent section being affixed in position extending generally horizontally below said outer securement section and above the generally horizontally extending upwardly facing surface of the floor assembly immediately surrounding the vertical opening therebelow responsive to engagement of the water closet flange assembly.

2. The improved firestopping means being responsive to heating thereof for selectively sealing a vertical opening in a floor assembly having a drain pipe extending upwardly therewithin as defined in claim 1 wherein said inner intumescent section extends outwardly horizontally radially inwardly from said outer securement section to a position immediately over and above the vertical opening in the floor assembly to facilitate intumescent sealing thereof responsive to exposure to heat.

3. The improved firestopping means being responsive to heating thereof for selectively sealing a vertical opening in a floor assembly having a drain pipe extending upwardly therewithin as defined in claim 2 wherein said inner intumescent section extends radially inwardly from said outer securement section to a position also immediately adjacent the drain pipe for intumescent sealing therearound within the vertical opening responsive to exposure to heat.

4. The improved firestopping means being responsive to heating thereof for selectively sealing a vertical opening in a floor assembly having a drain pipe extending upwardly therewithin as defined in claim 1 wherein said inner intumescent section is generally annular in shape and wherein said outer securement section is generally annular in shape and extends radially outwardly from said inner intumescent section to a position held above the floor assembly surrounding the vertical opening and beneath the water closet flange means to facilitate retaining thereof in position immediately adjacent and above the vertical opening in the floor assembly.

5. The improved firestopping means being responsive to heating thereof for selectively sealing a vertical opening in a floor assembly having a drain pipe extending upwardly therewithin as defined in claim 4 wherein said inner intumescent section and said outer securement section are concentric with respect to each other.

6. The improved firestopping means being responsive to heating thereof for selectively sealing a vertical opening in a floor assembly having a drain pipe extending upwardly therewithin as defined in claim 1 wherein said inner intumescent section and said outer securement section are integrally formed with respect to each another.

7. The improved firestopping means being responsive to heating thereof for selectively sealing a vertical opening in a floor assembly having a drain pipe extending upwardly therewithin as defined in claim 1 wherein said inner intumescent section is made of a resilient intumescent foam.

8. The improved firestopping means being responsive to heating thereof for selectively sealing a vertical opening in a floor assembly having a drain pipe extending upwardly therewithin as defined in claim 7 wherein said outer securement section is made of a resilient intumescent foam.

9. The improved firestopping means being responsive to heating thereof for selectively sealing a vertical opening in a floor assembly having a drain pipe extending upwardly therewithin as defined in claim 1 wherein said inner intumescent section defines a drain pipe aperture means therewithin to facilitate positioning therearound in surrounding relationship with respect to the drain pipe for intumescent sealing therearound responsive to exposure to heat.

10. The improved firestopping means being responsive to heating thereof for selectively sealing a vertical opening in a floor assembly having a drain pipe extending upwardly therewithin as defined in claim 9 wherein said inner intumescent section includes a contoured inner edge surrounding the drain pipe aperture means and the water closet flange assembly and where said contoured inner edge is shaped complementary to the external shape of the drain pipe and the water closet flange assembly to facilitate positioning thereadjacent for enhancing intumescent sealing therearound responsive to exposure to heat.

11. The improved firestopping means being responsive to heating thereof for selectively sealing a vertical opening in a floor assembly having a drain pipe extending upwardly therewithin as defined in claim 1 wherein said outer securement section and said inner intumescent section are waterproof.

12. The improved firestopping means being responsive to heating thereof for selectively sealing a vertical opening in a floor assembly having a drain pipe extending upwardly therewithin as defined in claim 1 wherein said outer securement section is adapted to be positioned in direct abutment with the floor assembly immediately surrounding the vertical opening and with the water closet flange means of the water closet flange positioned in direct abutment with said outer securement section and immediately thereabove.

* * * * *